C. S. BURTON.
AUTOMATIC PLAYER EXHAUST AND CONTROLLING MECHANISM.
APPLICATION FILED FEB. 8, 1915.
1,210,143.
Patented Dec. 26, 1916.
7 SHEETS—SHEET 4.
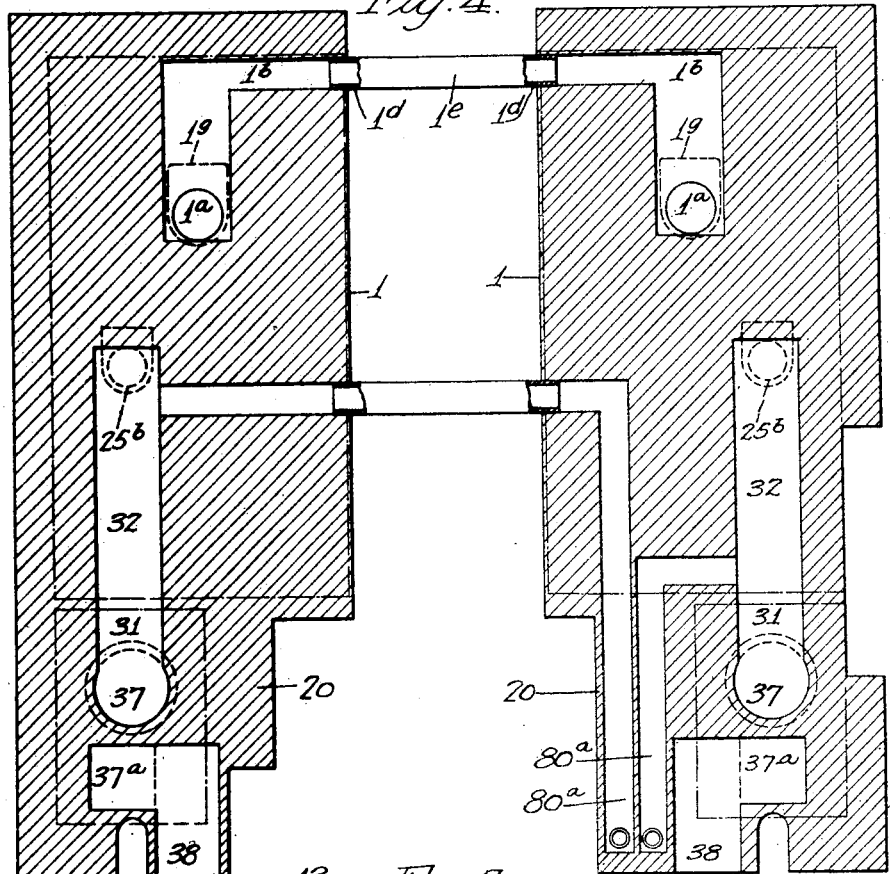
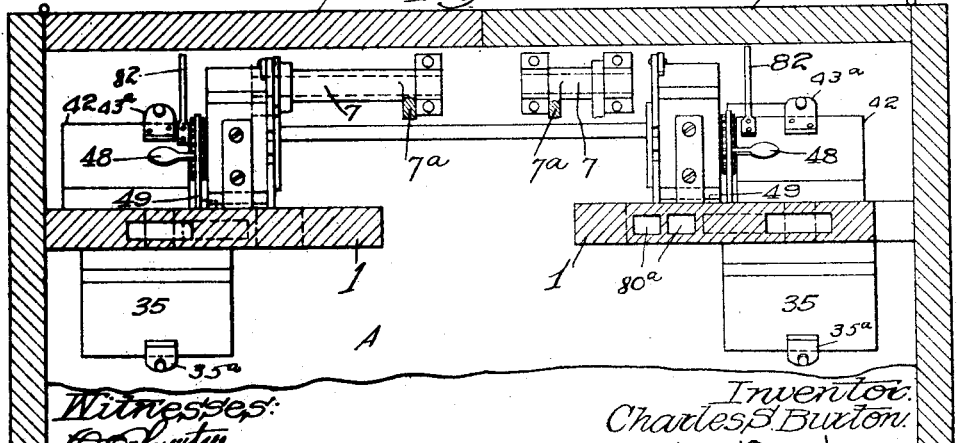

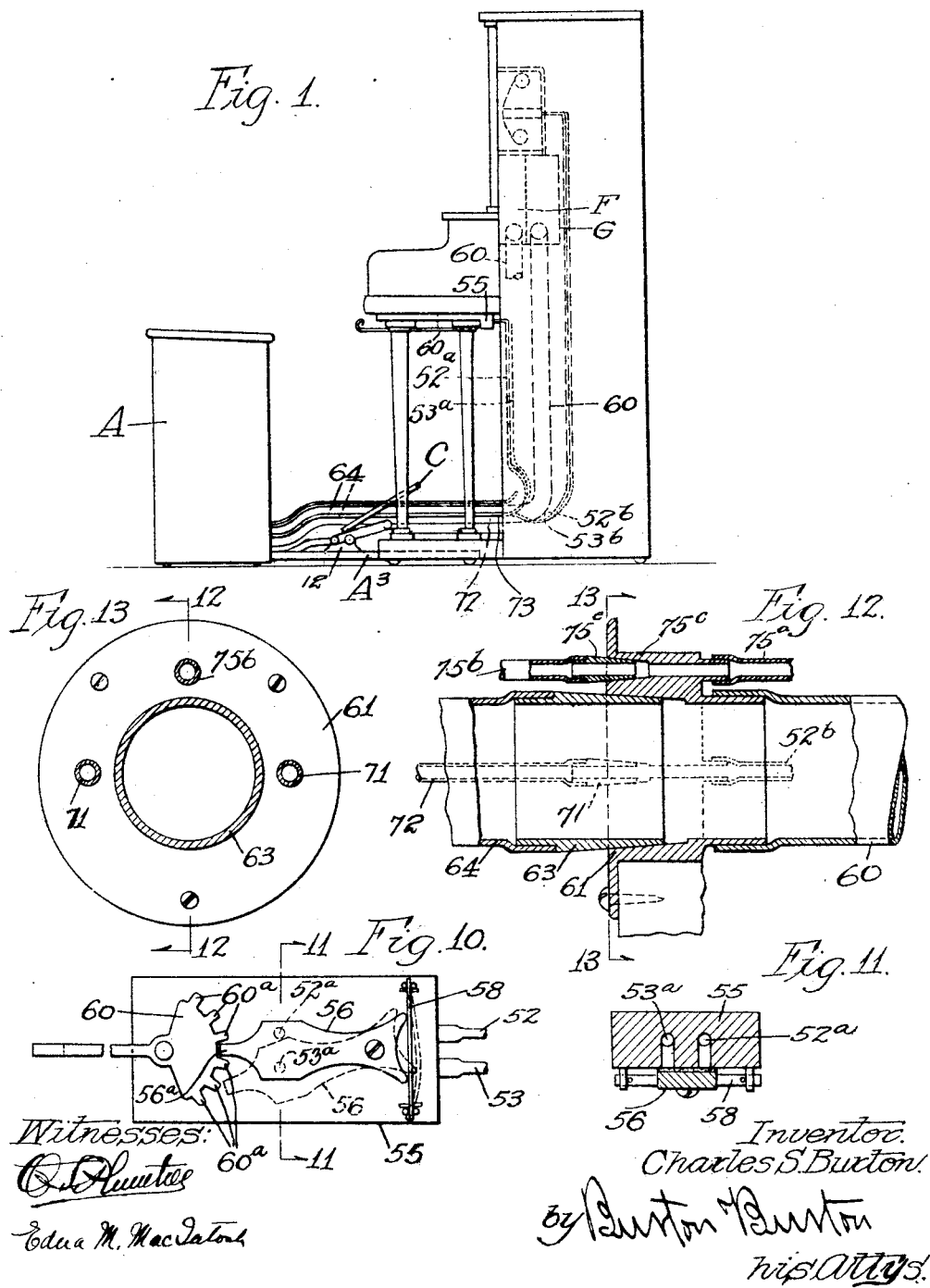

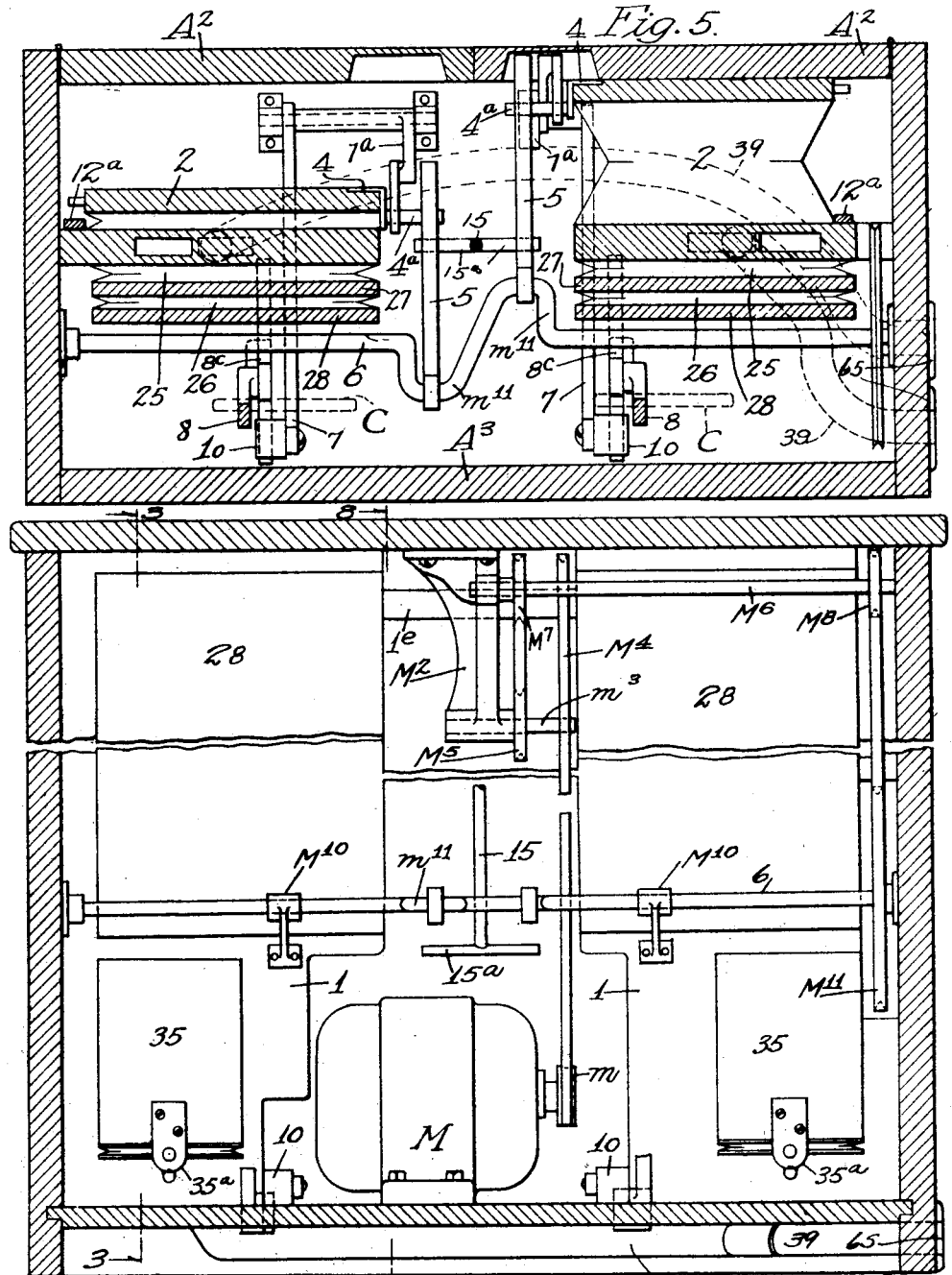

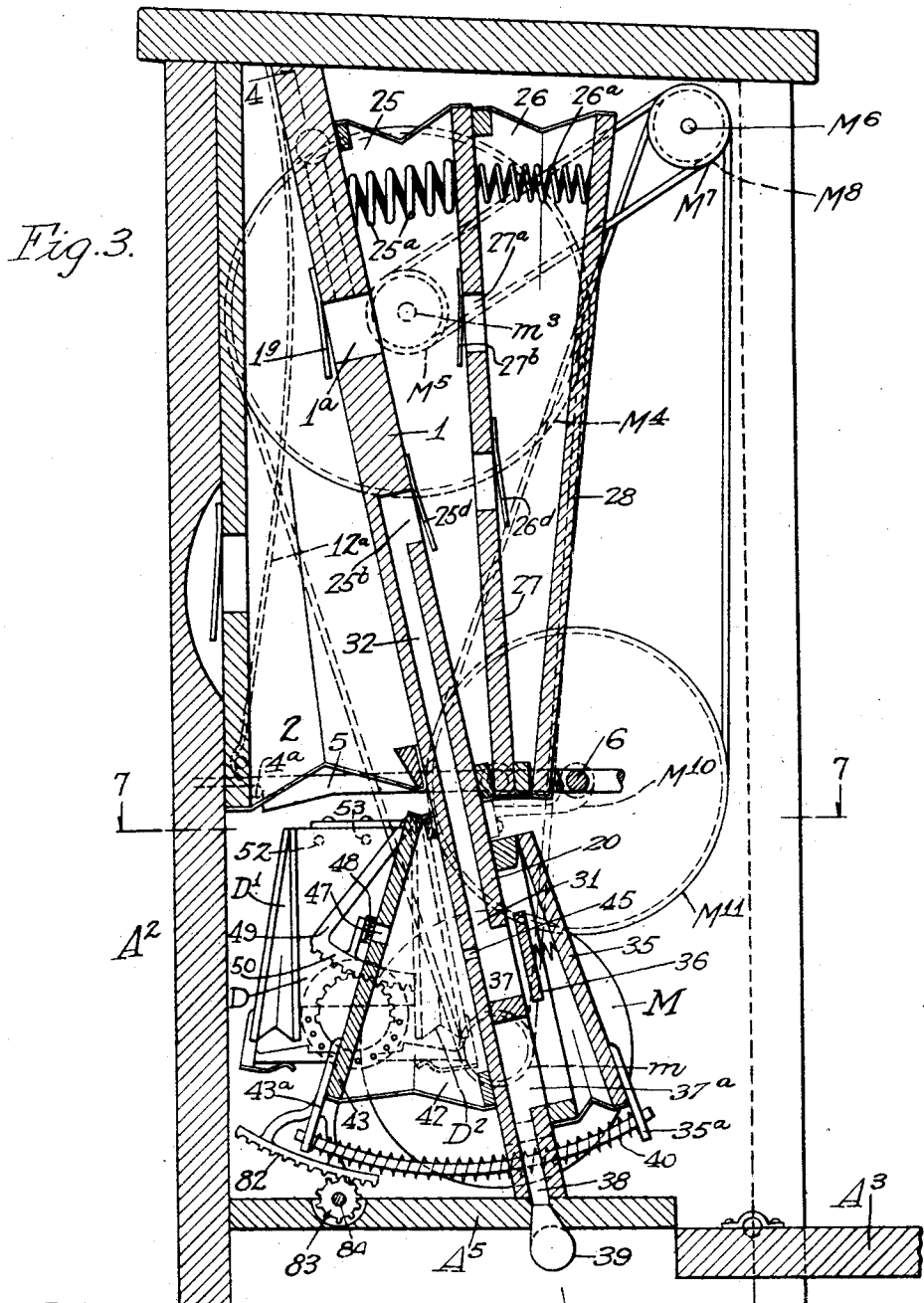

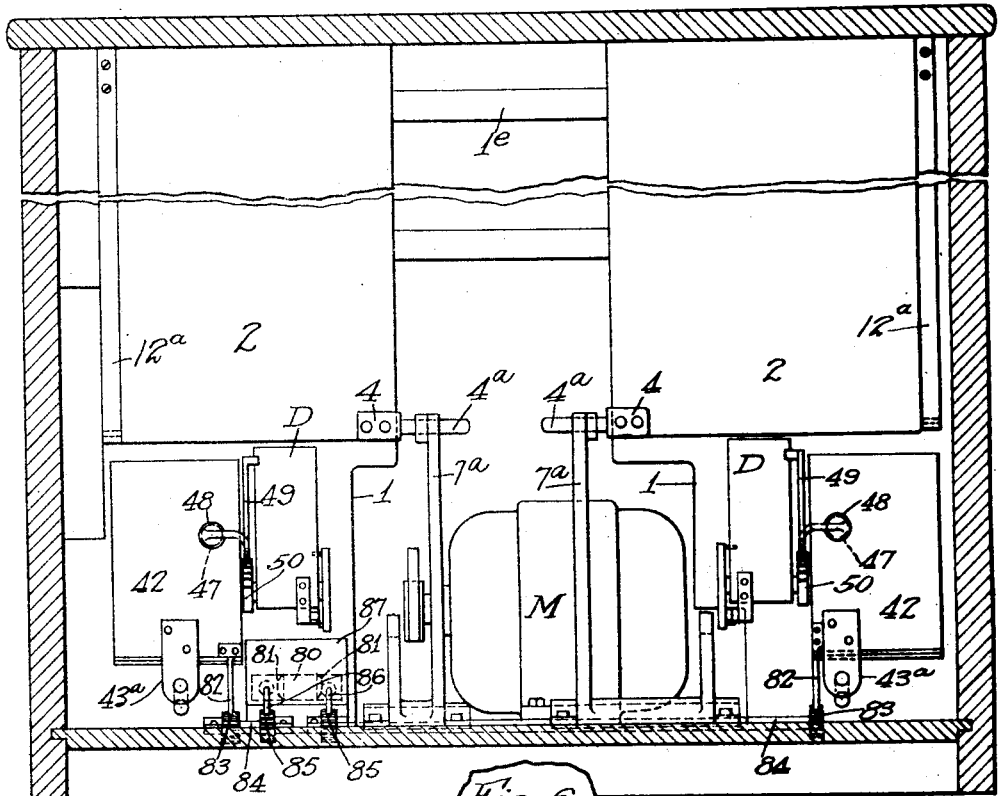
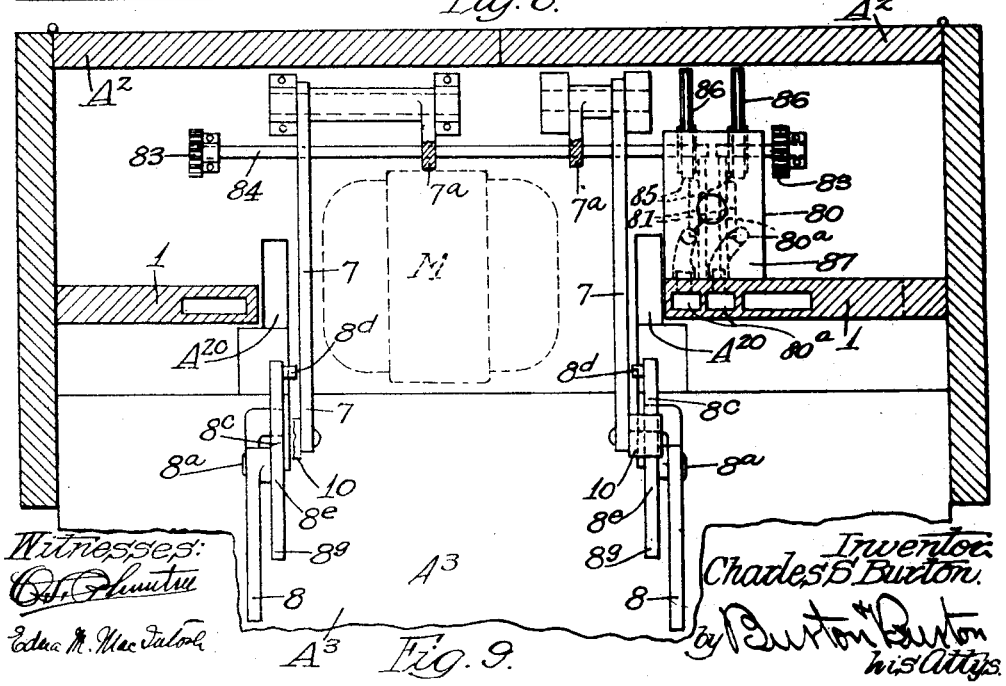

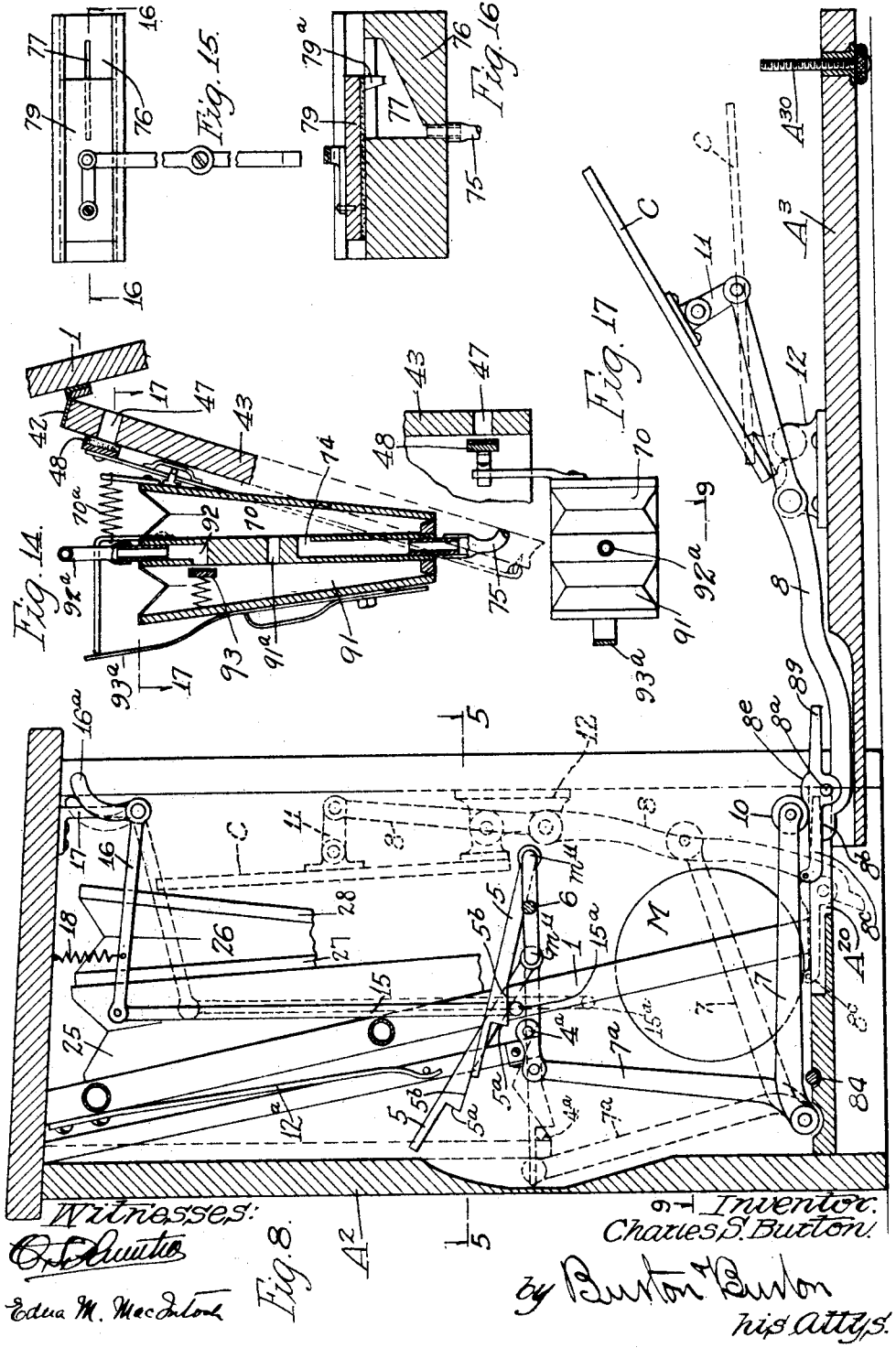

C. S. BURTON.
AUTOMATIC PLAYER EXHAUST AND CONTROLLING MECHANISM.
APPLICATION FILED FEB. 8, 1915.
1,210,143.
Patented Dec. 26, 1916.
7 SHEETS—SHEET 7.
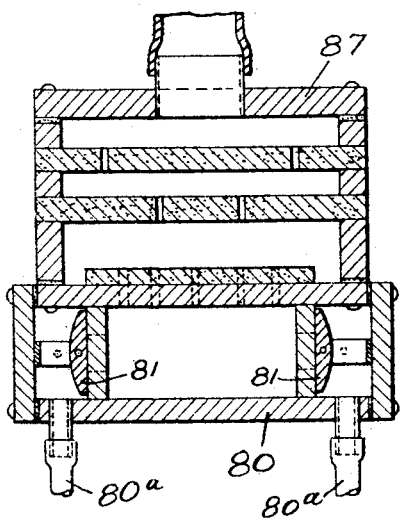
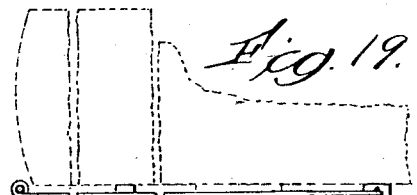
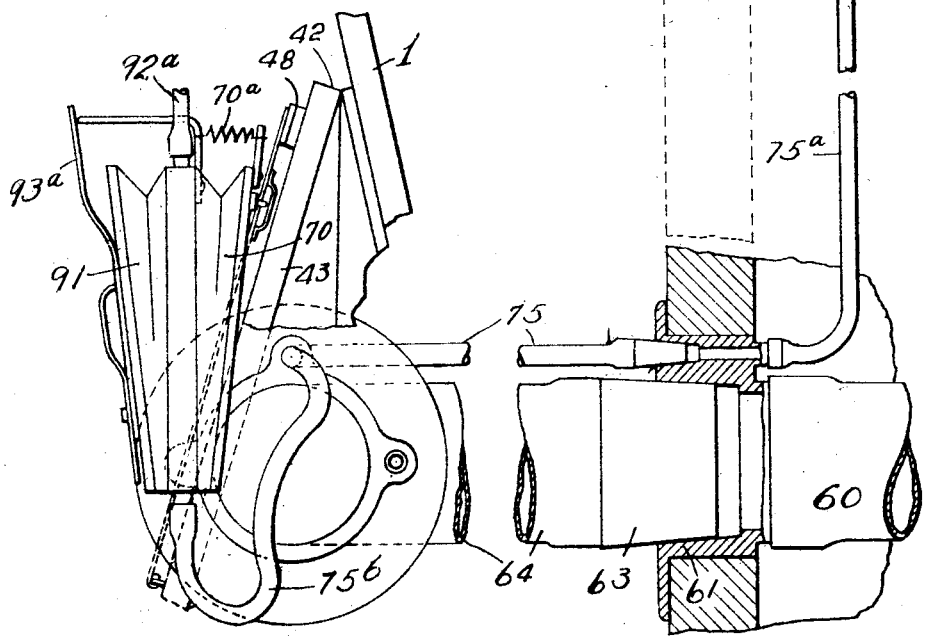
Witnesses:
Inventor:
Charles S. Burton,
by Burton & Burton
his Attys.

UNITED STATES PATENT OFFICE.

CHARLES S. BURTON, OF OAK PARK, ILLINOIS.

AUTOMATIC PLAYER EXHAUST AND CONTROLLING MECHANISM.

1,210,143.          Specification of Letters Patent.      Patented Dec. 26, 1916.

Application filed February 8, 1915. Serial No. 6,720.

*To all whom it may concern:*

Be it known that I, CHARLES S. BURTON, a citizen of the United States, residing at Oak Park, in the county of Cook and State of Illinois, have invented new and useful Improvements in Automatic Player Exhaust and Controlling Mechanisms, of which the following is a specification, reference being had to the accompanying drawings, forming a part thereof.

The purpose of this invention is to provide an improved construction in automatic piano players in respect to the exhaust mechanism and means of controlling the expression or dynamic character of the playing.

It consists in the elements and features of construction shown and described as indicated in the claims.

In the drawings: Figure 1 is a partly diagrammatic view showing a portion of the piano case and a player's bench in operative relation to the piano, and the tubes which connect the devices in the bench with those in the piano case, certain details being shown in section and the several elements of the mechanism being indicated only in outline and without regard to exact position. Fig. 2 is a forward side elevation of the player's bench and mechanism therein, the front board and parts thereon being removed. Fig. 3 is a section at the line, 3—3, on Fig. 2. Fig. 4 is a section at the line, 4—4, on Fig. 3. Fig. 5 is a section at the line, 5—5, on Fig. 8. Fig. 6 is a rear elevation of the bench and contents, the rear doors being removed. Fig. 7 is a horizontal section at the line, 7—7, on Fig. 3. Fig. 8 is a vertical section at the line, 8—8, on Fig. 2, showing the front board and parts thereon folded down from pedal-operating position. Fig. 9 is a detail section at the line, 9—9, on Fig. 8. Fig. 10 is a detail plan view of manually operable means for controlling one form of the expression-regulating or governing devices. Fig. 11 is a section at the line, 11—11, on Fig. 10. Fig. 12 is an axial section of air pipe coupling devices. Fig. 13 is a section at the line, 13—13, on Fig. 12. Fig. 14 is a vertical section of an expression-governing device of a modified form. Fig. 15 is a plan view of manual controlling means for the expression governing device shown in Fig. 14. Fig. 16 is a section at the line, 16—16, on Fig. 15. Fig. 17 is a section at the line 17—17 on Fig. 14. Fig. 18 is a section partly at the line, 18—18, and partly at the line, 18×—18×, on Fig. 9. Fig. 19 is a partly diagrammatic view showing the modification which is illustrated in Figs. 15 to 17, in assembled relation to the piano casing and the devices in the bench casing.

One purpose of the present invention is to avoid occupying the piano casing with the comparatively bulky pumping devices, storage bellows and regulating devices which are necessary parts or adjuncts of an auto-pneumatic piano player action, and to provide storage for all these parts in the player's bench. This involves providing means for connecting the devices which are thus mounted outside the piano case with the player action necessarily located within the case in juxtaposition or proximity to the manual keys or hammer action; and in connection with this feature of the invention it becomes necessary to provide air-tube connections which are readily disengageable, but which are nevertheless secure against leakage when connected.

A second purpose of the invention is to provide means for regulating the expression, that is the force of the playing and the relative force with which different parts are played; and particularly the relative force with which different notes sounded at the same time are struck, for distinguishing between solo and accompaniment and their analogous effect.

In the structure shown in the drawings, A is a player's bench which is in the form of a completely inclosed casing or cabinet, that is one which may be completely inclosed, but which preferably has the rear wall consisting of two swinging doors, A², A², which may be opened about their hinges to give complete access to the casing from the rear. The forward side, A³, of the bench or casing is hinged to the frame structure of the bench at the lower edge of its forward side for swinging down to a substantially horizontal position resting on the floor of the room and extending toward the piano.

The cavity of the bench or casing, A, contains the pumpers, air receiving bellows or reservoirs, (sometimes called storage bellows), and the expression-regulating or controlling devices. For supporting the pumpers and the air-receiving bellows there are mounted rigidly within the casing, A, bellows-supporting duct boards, 1, 1, both in the same plane in a position slightly inclined rearward, that is, extending down and toward the piano. Upon the rear side of the boards, 1, 1, respectively, there are mounted the pumpers, 2, 2, hinged at their upper sides and having their moving boards each provided with a lug, 4, extending from the lower edge of the board for connection with a pitman link, 5, from the crank shaft, 6, which is driven by a motor, B, as hereinafter more fully described, and also for connection with the upstanding arms, $7^a$, of bell crank levers, 7, said bell crank levers being actuated respectively by pedals, C, C, which are fulcrumed at their heels on brackets, 12, 12, mounted upon the upper or inner side of the said forward sideboard $A^3$, of the casing, and extend at operative position upward and forward from said heel pivots properly for convenient action of the feet of the operator seated upon the bench. Levers, 8, 8, also fulcrumed on the pedal supporting brackets, 12, 12, respectively, are connected by short links, 11, 11, with the respective pedals. When the front board, 3, is at horizontal position resting on the floor, said levers, 8—8, at their rear ends engage under rollers, 10, 10, which are mounted at the forward ends of the horizontal arms of the bell crank levers, 7, 7, respectively, and thereby the pedals operate the pumpers respectively. When the forward side, 3, of the casing is folded up to closed position, the levers, 8, 8, are out of engagement with the bell crank lever, 7, as shown in dotted line in Fig. 8.

The pitmen links, 5, 5, are constructed for engaging the lugs, 4, 4, of the pumpers by angle-shaped terminals, $5^a$, which are adapted to lodge on the pivot studs, $4^a$, with which the lugs, 4, 4, are provided, so that the rearward thrust of the pitmen expands the pumpers, the springs, $12^a$, operating for the return movement of the moving walls of the pumpers as the pitmen are withdrawn by the rotation of the cranks, respectively. In order that the pumpers may be free from the motor when they are being operated by the pedals, there is provided a lifter, 15, depending from the horizontal arm of a bell crank lever, 16, which is fulcrumed on a hanger, 17, mounted on the under side of the seat board or top of the bench. This lifter has at its lower end a cross bar, $15^a$, which engages under the pitmen, 5, 5. A spring, 18, connected at its upper end to the seat and at its lower end to the lever, 16, tends to uphold the lifter to a position at which it holds the pitmen out of engagement with the studs, $4^a$. The bell crank lever has an upstanding arm, $16^a$, which is encountered by the front board when the latter is folded up to closed position, and thereby the lever is rocked against the resistance of the spring, 18, and lowers the pitmen into position for lodgment upon the studs, $4^a$, in order to engage the moving walls of the pumpers. In order that this engagement may occur when the motor starts and the crank shaft is rotated, the lower edges of the pitmen are provided with slopes, $5^b$, leading to the lower ends of the vertically-extending shoulder of the angle-shaped terminals of the pitmen, so that as the cranks revolve after the pitmen are lowered onto the studs, $4^a$, the first forward stroke of each pitman causes it to rise up on the stud, $4^a$, and drop its angle terminal thereonto at the limit of said forward stroke so as to engage the stud in the rearward stroke for expanding the pumpers.

Both pumpers are designed to operate for exhausting both the air-receiving bellows or reservoirs hereinafter more particularly described; and for that purpose the ports, $1^a$, by which the respective pumpers communicate directly with the immediately opposite receiving bellows, as hereinafter more particularly described, are connected by ducts, $1^b$, in the duct boards, respectively, with nipples, $1^d$, which project rearward to the rear surface of said boards and are connected across the interval between the two boards by a piece of tubing, $1^e$. The reason for making the two boards separate and thus creating the necessity for the mode of connection described in order to connect both the pumpers with both the receiving bellows, is that there may be an interval between the two boards for conveniently locating certain of the wheels of the train by which a relatively high speed motor may give the desired relatively low speed reciprocation to the pumpers. This train is most conveniently as follows: The motor, M, is preferably located below the lower edge of the duct board, 1, in the middle portion of the length of the casing, but sufficiently one side from the exact middle so that the motor shaft may be within the width of the interval between the proximate edges of the two duct boards, so that on the upper part of the casing in the interval between the duct boards there is mounted a hanger, $M^2$, preferably suspended from the top or seat member of the casing, in which there is journaled a countershaft, $m^3$, which carries a large pulley, $M^4$, and rigid with it a small pulley, $M^5$, the pulley, $M^4$, being in line with the pulley, $m$, of the motor shaft, so as to be driven by a belt from said small pulley. In the upper forward corner of the casing there is mounted in hangers suspended from the seat board a shaft, $M^6$, having at one end a small pulley, $M^7$, alined with the small pulley, M⁵, and connected therewith by a belt, and at the other end which is near the end of the casing, a pulley, M⁸. A shaft, M⁶, positioned just below and in front of the lower edge of the receiving bellows hereinafter described, extends from one end to the other of the casing, being conveniently provided with intermediate bearings by means of brackets, M¹⁰, M¹⁰, mounted at the lower edges of the duct boards, 1, 1, respectively. This shaft has at one end a large pulley, M¹¹, alined with the pulley, M⁸, and driven by a belt therefrom; and in the fore-and-aft zone of the interval between the two duct boards this shaft has two small cranks, $m^{11}$, $m^{11}$, from which the pitmen links, 5, 5, extend to the studs, 4ᵃ, 4ᵃ, respectively of the lugs, 4, on the moving walls of the pumpers respectively. By this arrangement of the parts of the train, it will be seen that the space within the casing forward of that necessarily occupied by the bellows mechanism hereinafter described is kept clear from other wheels or parts which would prevent that space being occupied by the pedals when the duct board on which the pedals are mounted is folded up into closed position, and at the same time it is made possible to locate operatively the large pulley which it is sometimes necessary to employ in order to properly make reduction of the speed from the relatively high speed of an electric motor shaft to the lower speed necessary for the crank shaft which is to operate the pumpers.

The pedal operated levers, 8, are both made in two parts with a joint, 8ᵃ, of the character of a carriage joint,—that is, with a shoulder, 8ᵇ, on each of the two parts which stop against each other at open or operating position of the lever, the pivots of the joint between the two parts being alined with the pivots of the hinges which attach the front board to the bench. When the levers, 8, are at operative position shown in full line in Fig. 8, the member, 8ᶜ, of each lever is engaged with the roll, 10, that is to say the engagement is inward beyond the carriage joint which connects the two members of the lever. When the front board is folded up carrying up the lever, 8, to closed position of the front board, the member, 8ᶜ, is prevented from tipping down through the slot, 8ˣ, which is formed in the bottom of the bench to accommodate that member, by a pin, 8ᵈ, which extends across the slot; and the main member, 8, is thereby folded relatively to the member, 8ᶜ, as shown in dotted line in Fig. 8. It is necessary however, in order to accommodate the pedals at the closed position of the front board, that the pedal should be at depressed position relatively to the front board, as seen in dotted line in Fig. 8; and this compels the rear or lower end of the lever to move inward as shown in dotted line in that figure. To permit this movement the roll, 10, is mounted offset laterally from the lever arm which carries it so as to overhang the member, 8ᶜ, and said member, 8ᶜ, is offset laterally from the vertical plane of the main member, 8, of the pedal-operated lever, so that the lever, 8, with its member, 8ᶜ, swings inward as indicated without obstruction from the roll, 10, or the lever arm which carries it. In order to prevent the roll, 10, from getting out of touch with the lever member, 8ᶜ, in the action just described, said lever member, 8ᶜ, has an extension, 8ᵈ, projecting forward from the carriage joint, 8ᵇ, over which the roll, 10, rides when the lever moves into dotted line position shown.

Since it is not conveniently practicable to adjust the height of the player's bench when it contains the mechanism described, the only feasible method of adapting the device to persons of different height and length of limb is to provide for adjustment of the pedals; this is done by providing means for adjusting the front board to carry the pedals at the open or operative position by setting through the said front board near its upper or forward edge, screws, A³⁰, which form supports for said edge when the board is folded down to pedal-operating position. These screws being of sufficient length to permit them to be adjusted so as to protrude more or less from the front board and so to stop it on the floor at its operative position with its forward edge more or less elevated from the floor. In order that this adjustment of the front board may not interfere with the operation of the pedal connections from the pumpers, the member, 8ᶜ, of each of the pedal-operated levers is provided with an up-raised portion, 8ᵉ, curved about the axis of the carriage joint, 8ᵃ, with a radius equal to the distance from the axis of that joint to the surface of the roll, 10, at inactive position of the part, so that the roll rests against said up-raised portion, 8ᵉ, without having risen upon it when the front board is at the lowest position and the pedal is undepressed, that is, at the highest position, the pumper bellows being at collapsed position under the action of its spring. Now when the front board is adjusted to any higher position, the upraise, 8ᵉ, being curved about the axis about which such adjustment occurs, will move back under the roll, 10, without causing any movement of the roll, and the roll will remain in contact ready for instantly receiving the impulse of the pedal when the pedal is depressed, whatever be the adjustment of the front board for raising or lowering the pedals toward the seat with respect to the pedals.

Within the casing or player's bench, A, at the forward side of the bellows duct boards there are mounted the receiving bellows or expanding chambers, preferably compound, as illustrated, that is, comprising two bellows or expanding chambers, one mounted upon the other and controlled by expanding springs of different force, the bellows, 25, mounted directly upon the outer forward side of the board, 1, having the stronger spring, 25$^a$, and the bellows, 26, mounted upon the moving wall, 27, of the bellows, 25, having a weaker spring, 26$^a$. The bellows, 25, communicate with the pumpers through the valved port, 1$^a$, in the board, 1, controlled by the valve, 1$^s$, in the usual manner, and the bellows, 26, communicate with the bellows, 25, through the valved port, 27$^a$, in the board, 27, controlled by the valve, 27$^b$. It will be seen that with this construction the action of the pumpers will first exhaust and collapse the bellows, 26, which has the weaker spring, slightly collapsing the bellows, 25, meanwhile; and then the bellows, 26, is fully collapsed so that its moving board, 28, lies substantially flat upon the intermediate board, 27, further action of the pumpers will collapse and compress the bellows, 25. The purpose and advantage of this compound construction is, providing suitable capacity for sustained playing when operating with a light tension, and at the same time adapting the device to operate at higher tension, and with suitable capacity at such higher tension; for it will be understood that if only one bellows with a light spring were employed, the device would afford no capacity for continuous playing with a force greater than that afforded by the light tension bellows, and that any higher tension produced in the pneumatic action chambers would have to be in immediate response to each stroke of the pedal or pumper, and the music would be accented or pulsate with the pedal strokes; and on the other hand, if only one expansion chamber or receiving bellows were provided, with a heavy spring, pumping adapted to produce any desired lighter tension for light playing would compress the bellows only slightly, affording only correspondingly slight range of expansion for sustaining the playing; and continued playing with such light pressure could be effected only by the direct action of the pumpers upon the air chambers of the pneumatic action, and as in the former case the effect of each pedal stroke would be observable in the music, which would therefore pulsate with the pedal strokes. These undesirable effects are prevented by providing the two chambers, as described, with springs adapting them to collapse at different tensions, which, so to speak overlap, that is, so that the chamber having the heavier spring begins to collapse under tension not quite adequate to completely collapse the chamber having the lighter spring.

There is mounted in connection with each of the duct boards, 1, a duct board, 20, which may be a continuation of the board, 1, and is conveniently located in the casing below the lower edge of said board, 1. A duct, 31, in this duct board is in communication with and practically an extension of a duct, 32, in the board, 1, which leads from a port, 25$^b$, of the bellows, 25, controlled by a check valve, 25$^d$, in said bellows, and which thus leads ultimately from the bellows, 26, controlled by the check valve, 26$^d$, within the bellows, 26. At one side of said duct board, 20, there is mounted a governor pneumatic or bellows, 35, which carries on the inner side of its moving wall a valve, 36, adapted to seat over and control the port, 37, by which said governor bellows communicates with the duct, 31, in the duct board, 20, and thereby with the bellows, 25 and 26. From the governor bellows, 35, a port, 37$^a$, leads to a duct, 38. This duct, 38, opens through the lower edge of said duct board, 30, and the bottom board, A$^5$, in order to be connected by an air trunk, 39, with the air chamber, M, of the pneumatic action located in the piano casing. A spring, 40, is provided acting upon the moving wall of the governor pneumatic, 35, tending to hold it expanded, and to resist its collapse for seating the valve, 36, over the port, 27. The tension of this spring is controlled in the manner which will be shortly explained; but from the construction thus far described, it will be understood that whatever may be the tension maintained by the pumpers in the bellows, 25 and 26, the tension operating upon the pneumatic action through the duct, 38, and connecting air trunk, 39, can never be more than that which is necessary to collapse the governor bellows, 35, to seat the valve, 36; and that therefore the tension of the spring, 40, will determine the tension operating upon the pneumatic action, regardless of the tension in the bellows, 25 and 26, except that no greater tension can ever be obtained in the pneumatic action than exists in said bellows. For regulating the tension of the spring, 40, thereby controlling the tension which will be operative in the pneumatic action, and thus determining the force of the playing, there is mounted upon the duct board, 20, opposite the governor bellows, 35, a spring-tensioning pneumatic, 42, whose moving wall, 43, (or a lug, 43$^a$, thereon) stands opposed to the extended end of or a lug, 35$^a$, on the moving wall of the governor pneumatic, 35, the spring, 40, being interposed between said two moving walls (or lugs) so that it will be compressed and the tension increased by the collapse of the pneumatic, 42. The chamber of the pneumatic, 42, is in communication through a small port, 45, in the duct board, 20, with the duct, 31, therein, which thereby puts said pneumatic, 42, in communication with the bellows, 25, and 26. This would cause the pneumatic, 42, to be collapsed whenever the tension in the chambers, 25 and 26, was sufficient to overcome the resistance of the spring, 40, unless there were provided means for supplying atmospheric air to said pneumatic, 42, to compensate for the exhaustion which takes place through the port, 45. In the moving wall, 43, of said pneumatic, 42, there is provided a port, 47, of substantially the same area as the port, 45, (or a trifle larger to compensate for air friction) so that practically no collapse of the pneumatic, 42, will occur when the port, 47, is entirely open. There is, however, provided a valve, 48, for closing the port, 47, preferably mounted upon a lever arm, 49, fulcrumed upon said moving wall, 43. This valve, 48, is operatively connected with the segment rack bar, 50, of the double pneumatic governing device, D, which is a step-by-step feeding device pneumatically operated, adapted to actuate said segment rack step-by-step in either direction upon pneumatic impulse controlled either by a stop under control of the operator or by perforations in the note sheet. This step-by-step pneumatic operating device is substantially such as is fully shown in Melville Clark Patent No. 1,013,862, dated January 9, 1912, and need not be further described here, except to the extent of pointing out that it is connected by two air ducts, 52 and 53, with the stop or tracker board of the pneumatic action, one of said ducts being for controlling one of the small bellows, $D^1$, of said device for feeding the rack bar in one direction, and the other being for controlling the other small bellows, $D^2$, for feeding the rack bar in the opposite direction, one step in such feed movement being communicated each time the proper duct is uncovered by the stop device, or by the note sheet having an aperture for that purpose.

The operation of this expression-governing device is as follows: At what may be called the normal position of the parts with the governor pneumatic, 35, and the spring-tensioning pneumatic, 42, both expanded under the reaction of the spring, 40, between them, the valve, 48, is upon its seat, closing the port, 47, when the step-by-step operating device is holding the rack bar, 50, at the extreme limit of its range of movement away from the moving member, 43, of the pneumatic, 42. At this position of the parts the tension of the spring, 40, is the lightest possible, and the lightest tension which will produce any playing effect being produced in the bellows, 25, and 26, will cause the governor pneumatic, 35, to be collapsed seating the valve, 36, or holding it so that the tension operative upon the player action be governed is held at the lowest point for which the spring, 40, is constructed or primarily tensioned. The pneumatic, 42, however, being exposed to the exhaust action through the port, 45, will experience a collapsing movement of its wall, 43, which would tend to increase the tension of the spring, 40; but, upon the very commencement of such collapsing movement the wall, 43, will be withdrawn from the valve, 48, and the port, 47, will thereby be opened, compensating for the exhaust which takes place through the port, 45, and immediately stopping the collapsing movement; so that so long as the valve, 48, is held by the regulating device, D, at the position indicated, the tension operating for playing in the pneumatic action chambers will be that determined and governed by the tension of the spring, 40, at its maximum extension. If now the device, D, is operated through the medium of the duct, 52, for moving the slide rack bar, 50, in a direction to advance the valve, 48, toward the duct board, 20, such advance of the valve will cause it to follow up the movement of the movable member, 43, of the spring-tensioning pneumatic just to the extent of the movement communicated to said valve by the rack bar, 50, and to just that extent, therefore, the spring, 40, will be compressed and its operative strength increased, and the tension of the air operating in the pneumatic action will be correspondingly raised increasing the loudness of the playing. It will therefore be seen that the dynamic character of the playing will at all times be determined by the distance or number of steps through which the step-by-step operating device feeds may have moved the valve, 48, from its initial or normal position toward the duct board, 20.

It is designed that this apparatus should be applicable to a piano player action comprising two complete sets of devices for operating upon the piano keys or the hammer action of the piano for playing respectively a solo and accompaniment or any two parts which are to be played with a different force. For this purpose there are provided in the casing, A, two complete sets of expression controlling devices, each consisting of two pneumatics, 35 and 42, connected by the ducts, ports and valves described, with the bellows, 25 and 26, and having reacting between them a spring, 40, and having a step-by-step regulating device operating the valve, 48, which controls the leak port of the pneumatic, 42, each of said regulating devices, D, having two ducts, 52 and 53, as described, extending to ducts in the tracker, or to stop devices to be operated by hand, as above indicated. The foregoing description may be taken as applying to either one of these separate sets of devices, both of which are shown in Fig. 4 of the drawings, situated at opposite ends of the casing, A, below the bellows, 25 and 26. When these devices are to be controlled by ducts in the tracker governed by perforations in the note sheet, the method of such control is well understood. When they are to be controlled by hand by stop devices, there may be employed a stop device shown in Fig. 10, which will now be described. Ducts, $52^a$ and $53^a$, which are the continuation in the piano case or player action of the ducts, 52 and 53, above described, open at the surface of a duct board, 55, which is mounted in any convenient position on the piano casing, and at such surface is provided with a controlling valve, 56, which is mounted so as to extend over the ports of both ducts, $51^a$ and $52^a$, and uncover one of them by a movement in one direction and the other by movement in the opposite direction. Preferably the valve is pivoted and swings about its pivot for such movement with respect to the ports, respectively, and is provided with a spring, 58, which yieldingly resists its movement in either direction from a position at which it covers both ports. A segment, 60, is provided with as many trip teeth or cams as the number of step movements for which the device, D, is constructed, and is pivoted at the center for swinging to carry the trip teeth, $60^a$, successively against the trip lug, $56^a$, which projects from the valve, 56, into the path of said cams. When the segment is swung in one direction each cam projection encountering and passing the trip lug, $56^a$, causes the valve to uncover and cover again the corresponding port of the duct, $52^a$; and when the segment is swung in the opposite direction the valve is caused to cover and uncover the port of the duct, $53^a$, at each encounter and passing of the valve trip finger by one of the trip teeth or cams, $60^a$. By this means the operator will cause the device, D, to set the valve, 48, at 1, 2, 3 or 4 steps distance away from the most collapsed position of the board, 43, of the pneumatic, 42, thereby causing it to correspondingly tension the spring 40. It will be understood that precisely the same results would follow from the passage of successive perforations of the note sheet on the tracker over the ends of the tracker ducts with which branch ducts, $52^b$ and $53^b$, of the ducts, $52^a$ and $53^a$, may be connected.

It will be understood from the foregoing description that the air trunk, 39, is to be in connection with an air trunk in the piano casing leading to the pneumatic action therein, and that the ducts, 52 and 53, are to be afforded connection with ducts, $52^a$ and $53^a$. For this purpose the air trunks, 60, 60, leading from the pneumatic actions, F and G, respectively, in the piano case (for playing respectively the solo and accompaniment) lead to mouth-pieces, 61, 61, which are metal fittings mounted at any convenient point, preferably in the forward side of the piano case near the floor, having slightly tapered mouths adapted to receive correspondingly tapered plugs, 63, 63, which terminate flexible tubes, 64, 64, made of suitable length to reach from the foot of the player's bench to the point on the piano case at which the mouth-pieces, 61, 61, are positioned; the opposite ends of said flexible tubes have similar tapered plugs, 63, 63, which are adapted to fit air-tight into fittings, 65, 65, mounted on the player's bench and to which the air trunks, 39, 39, respectively, lead. Similarly the ducts, $52^a$ and $52^b$, leading from the duct board and tracker in the piano case terminate in fittings, 71, 71, mounted on the piano case, preferably near to the fittings 61, 61, which terminate the air trunks at the surface of the piano case, and flexible tubes, 72, 72, and 73, 73, provided with tapered plugs adapted to fit the tapered mouths of the fittings, 71, 71, are made of suitable length to extend across the interval between the bench and the piano case, and at their opposite ends having similar fittings are adapted to make air-tight connections with the fittings, 65, to which the ducts, 52 and 53, respectively, lead.

When the expression-governing device is to be controlled by manual operation of the performer, it is possible to effect such control perfectly gradually, that is, not merely step-by-step; and for that purpose the devices shown in Figs. 14, 15 and 16 are preferred to the step-by-step operating devices above described. In the construction shown in said Figs. 14, 15 and 16, the valve, 48, is controlled in respect to its position for controlling the degree of collapse of the spring-tensioning pneumatic, 42, by means which are connected with the exhaust devices through the medium of a governing pneumatic, 91, of the same character and operating in the same manner as the governing pneumatic, 35, that is, having a port, 92, which communicates through the tube, $92^a$, with the exhaust devices controlled by a valve, 93, carried by the moving wall of said governing pneumatic, which is collapsed against the resistance of a spring, $93^a$, whose tension therefore determines the exhaust tension which will at any time be producible in said governing pneumatic, 91, and thereby in the pneumatic, 70, held normally expanded by the spring, $70^a$, and which communicates through a port, $91^a$, with the governing pneumatic, 91. The pneumatic, 70, has an air inlet or supply port, 74, which is supplied by a duct, 75, (comprising when the governing devices are located in the player's bench as shown, the parts, $75^a$ and $75^b$, in the piano case and player's bench, respectively,) and a tube, not shown but precisely like the tube, 92, and having similar connecting plugs, having tapered plugs, 75ᶜ, at both ends for connecting the mouth piece fittings, 75ᶜ, identical in form on the piano case and bench (shown only on the piano case, see Fig. 12). This duct, 75ᵃ, leads to a tapering mouth piece, 76, whose mouth is a long very thin slit, 77, at the surface of the block constituting said mouth piece, 76, forming a valve seat upon which a valve, 79, is mounted to slide longitudinally of the slit to uncover more or less of the same. The total area of the slit which constitutes the mouth of the duct is calculated to be substantially equal to the area of the port, 74, which opens into the pneumatic, 70, so that said slit when completely uncovered will admit only as much air as would normally pass through the aperture, 74, if the same were entirely unobstructed. It will be seen that with the port, 74, equaling the port 91ᵃ, if said port, 74, were entirely unobstructed, the exhaust devices would produce no action whatever on the pneumatic, 70, and that the collapse of said pneumatic, 70, will be produced by the exhaust to the extent that the admission of air into said pneumatic is restricted by closing more or less of the area of said slit and that the degree to which the pneumatic, 70, is held collapsed will at all times depend substantially upon the position of the valve, 79, over the slit. This valve being provided with any convenient means by which the operator or performer may adjust it along the slit, the performer is enabled to control the position of the valve, 48, and thereby to control the exhaust-tension operative through the governing pneumatic, 35, upon the pneumatic action, for determining the loudness of the playing. In order that the slit, 77, may be kept clear of dust, which in view of the extreme narrowness of the slit would easily clog it enough to modify the governing action, the valve, 79, has a fin, 79ᵃ, which projects into the slit and clears it at every reciprocation of the valve along the slit.

When the pumping mechanism is operated by a motor, especially when it is an electric motor, it is important to avoid loading the motor continuously up to the maximum work required of it for maintaining both the exhaust devices (for solo and for accompaniment) at the condition for the loudest playing; to avoid loading the motor it is desirable that when the governing devices are operated for lightening the playing so that only a portion of the exhaust capacity is required and used, the receiver bellows should automatically be vented down to an exhaust tension a little above that which is being required, thus relieving the load upon the motor to that extent. For this purpose the air passage leading from the governor, 35, to the receiving bellows, 25, of each of the exhaust devices shown, that is, for the solo and for the accompaniment playing,—is connected by a duct, 80ᵃ, with a relief box, 80, in which there is a relief valve, 81, which is operated for opening by mechanical connection with the moving wall of the spring-tensioning bellows, 42, when that bellows is expanded, and for closing when the spring-tensioning bellows is collapsed. The operating connections shown consist of a segment rack, 82, carried by the moving wall of the bellows, 42, engaging a pinion, 83, on a rock shaft, 84, which has a second pinion, 85, engaging a rack, 86, on the stem of the relief valve, 81. Said relief valve controls communication of the passage, 32, with a muffler device, 87, through which the air enters for relieving the bellows without producing unpleasant noise. The specific construction of this muffler device is not fully shown, but it may be substantially that which is shown in Melville Clark Patent No. 1,136,656, dated April 20, 1915.

I claim:

1. A musical instrument player's bench having a chamber under the seat; a pumper and a rotary motor for operating it mounted in said chamber; speed-reducing connections from the motor to the pumper, comprising a crank shaft and a pitman mounted upon the crank thereof and connected with the moving wall of the pumper; said pitman having for said connection with the pumper wall a terminal open toward and in the direction of thrust of the pitman; a pivot stud connected with the pumper wall for moving the same positioned for the lodgment thereon of said terminal; a spring to retract the said moving wall, and means for causing the pitman to be disengaged from said pivot stud.

2. A musical instrument player's bench having a chamber under the seat; a pumper bellows and rotary motor for operating the same mounted in said chamber; a member which is connected operatively with the moving wall of the pumper bellows for operating the same, having a pivot stud projecting for engagement with the pitman, the pitman having an open bearing for engaging said pivot stud, and means for holding the pitman out of engagement with the stud.

3. A musical instrument player's bench having a chamber under the seat; a pumper bellows and rotary motor for the same mounted in said chamber; operating connections from the motor to the pumper, comprising a crank shaft; a pitman on the crank shaft and a member connected with the moving wall of the bellows for operating the same having a pivot stud which is engaged by the pitman; pedals and operating connections therefrom to the moving wall of the pumper bellows, said pedal connections being adapted for positively operating the moving wall of the pumper bellows in one direction only, and a spring which retracts said moving wall; the pitman having an open bearing for engaging the pivot stud for operating the pumper bellows, and means for causing the pitman to be disengaged from said stud.

4. In combination with a player's bench having a chamber under the seat; a pumper bellows in said chamber; a member hinged at the forward side of the chamber for folding downward forwardly toward horizontal position; a pedal mounted upon the inner side of said member; a lever operatively connected with the pedal mounted on said member; a second lever mounted in the chamber and connections therefrom for operating the pumper bellows, said first mentioned lever having its rear end positioned for engaging under the second mentioned lever when said hinged member is at horizontal position, and a spring for retracting the moving wall of the bellows.

5. In combination with a player's bench having a chamber under the seat; a pumper bellows in said chamber; a member hinged at the forward wall of the chamber for folding down from upright toward horizontal position; a pedal mounted on the inner side of said hinged member; lever connections from the pedal to the moving wall of the pumper bellows for operating the latter in one direction, and a spring for retracting it in the opposite direction, said lever connections comprising one part mounted on the hinged member and another part mounted within the chamber, said two levers having their proximate ends articulated for communication of motion from one to the other only in the direction for operating the moving wall of the bellows in opposition to said spring, said parts being so articulated at a point near to the hinge line of said hinged member.

6. In combination with a player's bench having a chamber under the seat, a pumper bellows in said chamber; a rotary motor for operating the pumper bellows mounted in said chamber; a crank shaft rotated by said motor; a pitman connected with the crank of said shaft at one end and having at the other end a bearing for a pivot which is open in the direction of thrust of the pitman; a pivot stud connected with the pumper wall for moving the same, positioned for lodgment thereon of said open bearing of the pitman; a spring to retract said moving wall of the pumper; a member hinged at the forward wall of the chamber for folding down from upright toward horizontal position; a lever arm connected with the means for disengaging the pitman from the pivot stud, said lever arm being positioned for encounter by said hinged member of the bench when the latter is moved to its upright or bench-closing position and to be moved thereby in the direction for engaging the pitman with the pivot stud.

7. In combination with a player's bench, a pumper mechanism and a motor for operating the same mounted in the bench, the bench having a front member which moves down forward, and pumper operating pedals mounted on its inner side; connections from said pedals to the pumper mechanism in the bench; means for connecting and disconnecting the motor and the pumper mechanism, comprising a part which is actuated by the movement of said folding front member and connected for disengaging the motor from the pumper mechanism when said front member is folded down to pedal-operating position.

8. A musical instrument player's bench having a chamber under the seat; a pumper bellows and a rotary motor for the same mounted in said chamber; operating connections from the motor to the pumper comprising a crank shaft; a pitman on the crank shaft, and a member connected with the moving wall of the bellows for operating the same, having a pivot stud which is engaged by the pitman; pedals and operating connections therefrom to the moving wall of the pumper bellows, said pedal connections being adapted for positively operating the moving wall of the bellows in one direction only, and a spring which retracts said moving wall; the pitman having an open bearing for engaging the pivot stud for operating the pumper bellows, and adapted to come into such engagement by gravity; means for lifting it out of such engagement; means by which the pedals are carried into pumper-operating position, and connections by which said last mentioned means actuates the pitman-lifting devices for withdrawing support from the pitman to permit it to fall into engagement with the pivot stud.

9. In combination with a musical instrument case having therein the tracker and note-sheet and pneumatic action of the player mechanism; an air trunk in said instrument case leading from the pneumatic action to an exteriorly exposed portion of the case; pressure-controlling ducts in the musical instrument case leading from the tracker to an exteriorly-exposed portion of the case; a player's bench having mounted in it an exhaust mechanism and pressure-governing devices, an air trunk for supplying air to said exhaust mechanism, and air ducts for operating the pressure-governing devices which are mounted in the bench, said air-trunk and air ducts having terminals adapted for air-tight connection with the mouths of the air trunk, and of the expression controlling ducts in the musical instrument case.

10. In automatic piano playing mechanism, a receiving bellows and means for exhausting it, an air trunk for connecting it with a pneumatic action; a governing pneumatic interposed between the receiving bellows and the air trunk; a spring which controls the governing bellows; a spring-tensioning pneumatic having limited air communication with the receiving bellows, and a leak port for supplying air up to the capacity of said limited air communication; means for controlling said leak port comprising a valve which is normally open, and means for closing it by the movement of the moving wall of said spring-tensioning pneumatic in expanding, means for adjusting said closing means to adapt it to operate for closing the valve at any determined position of said moving wall, comprising a step-by-step pneumatic feeding device, an air tube connecting said feeding device with the receiving bellows, and vent ducts connected with the pneumatic of said feeding device, and means for controlling said vent ducts.

11. In combination with a musical instrument case having therein the tracker and note-sheet-operating mechanism and pneumatic action of a player mechanism; an air trunk in said instrument case leading from the pneumatic action to an exteriorly-exposed portion of the case, and pressure-controlling ducts in the musical instrument case leading from the tracker to an exteriorly-exposed portion of the case.

12. A player's bench having mounted in it an exhaust mechanism and pressure controlling devices, an air trunk for supplying air to said exhaust mechanism, and air ducts for operating the pressure-controlling devices mounted in the bench, said air trunk and air ducts having terminals adapted for air-tight connection with the mouths of an air trunk and pressure-controlling ducts which may be mounted in a musical instrument case.

13. In an auto-pneumatic playing mechanism in combination with a receiving bellows, an air trunk through which the same is supplied and which is adapted for connection with a pneumatic player action; a governing pneumatic interposed between the bellows and the air trunk; a spring which controls the governing pneumatic; a pneumatic for tensioning said spring, the spring-tensioning pneumatic having limited communication with the receiving bellows, and a leak port substantially equal to said limited communication; a valve which controls the leak port; means for operating the valve to cause it to close at any determined position of the moving wall of the spring-tensioning pneumatic; said means comprising a pneumatic having a spring for expanding it, and a governed communication with the exhaust devices for maintaining substantially uniform exhaust tension therein, and having an atmospheric inlet port substantially equal to the port of said pneumatic through which the same is exhausted, and means for gradually choking said inlet port.

14. In a pneumatic governing device for the purpose of causing a gradual action of the same as distinguished from a step-by-step action, a collapsible pneumatic having governed communication with a source of exhaust tension; a port leading into said pneumatic through which such communication is obtained; an atmospheric inlet port into said pneumatic; a passage leading to said atmospheric inlet port having its mouth at the atmospheric side or end extended in the form of a long thin slit or crevice; a valve mounted for sliding over said slit, and means for operating the valve to move it lengthwise of the slit, the total area of the slit at the surface of the seat on which the valve slides being substantially equal to that of said atmospheric inlet port of the pneumatic.

15. In a pneumatic governing device for the purpose of causing a gradual action of the same as distinguished from a step-by-step action, a collapsible pneumatic having governed communication with a source of exhaust tension; a port leading into said pneumatic through which such communication is obtained; an atmospheric inlet port into said pneumatic; a passage leading to said atmospheric inlet port having its mouth at the atmospheric side or end extended in the form of a long thin slit or crevice; a valve mounted for sliding over said slit, and means for operating the valve to move it lengthwise of the slit, the total area of the slit at the surface of the seat on which the valve slides being substantially equal to that of said atmospheric inlet port of the pneumatic; the sliding valve having a thin fin which is moved in the slit by the travel of the valve for clearing the slit of dust.

16. In automatic piano playing mechanism, a receiving bellows and means for exhausting it, an air trunk for connecting it with a pneumatic action; a governing pneumatic interposed between the receiving bellows and the air trunk; a spring which controls the governing bellows; a spring-tensioning pneumatic having limited air communication with the receiving bellows, and a leak port for supplying air up to the capacity of said limited air communication; means for controlling said leak port comprising a valve which is normally open, and means for closing it by the movement of the moving wall of said spring-tensioning pneumatic in expanding; a duct for relieving the receiving bellows by atmospheric communication; a valve which controls such communication and connections from the moving wall of the spring-tensioning pneumatic for closing said valve by the collapsing movement of said wall and opening it by the opposite movement.

In testimony whereof witness my hand at Chicago, Illinois, this 6th day of February, 1915.

CHARLES S. BURTON.

Witnesses:
EDNA M. MACINTOSH,
LUCY I. STONE.

Copies of this patent may be obtained for five cents each, by addressing the "Commissioner of Patents Washington, D C."